(12) United States Patent
Van Dijck et al.

(10) Patent No.: US 10,302,819 B2
(45) Date of Patent: May 28, 2019

(54) PROCESS FOR MAKING AN ANTI-REFLECTIVE COATING COMPOSITION AND A POROUS COATING MADE THEREFROM

(71) Applicant: DSM IP ASSETS B.V., Heerlen (NL)

(72) Inventors: Michael Alphonsus Cornelis Johannes Van Dijck, Echt (NL); Hermanus Adrianus Langermans, Echt (NL); Jacobus Adriaan Antonius Vermeulen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 98 days.

(21) Appl. No.: 15/036,909

(22) PCT Filed: Nov. 24, 2014

(86) PCT No.: PCT/EP2014/075402
§ 371 (c)(1),
(2) Date: May 16, 2016

(87) PCT Pub. No.: WO2015/075229
PCT Pub. Date: May 28, 2015

(65) Prior Publication Data
US 2016/0291206 A1     Oct. 6, 2016

(30) Foreign Application Priority Data

Nov. 22, 2013  (EP) .................................... 13194085

(51) Int. Cl.
| G02B 1/111 | (2015.01) |
| C09D 5/00 | (2006.01) |
| C09D 5/02 | (2006.01) |
| C09D 133/08 | (2006.01) |
| C09D 133/12 | (2006.01) |
| C09D 133/14 | (2006.01) |

(52) U.S. Cl.
CPC .............. *G02B 1/111* (2013.01); *C09D 5/006* (2013.01); *C09D 5/022* (2013.01); *C09D 133/08* (2013.01); *C09D 133/12* (2013.01); *C09D 133/14* (2013.01)

(58) Field of Classification Search
CPC ...... C09D 5/006; C09D 5/022; C09D 133/08; C09D 133/12; C09D 133/14; G02B 1/111
See application file for complete search history.

(56) References Cited

U.S. PATENT DOCUMENTS

| 8,580,311 | B2 | 11/2013 | Armes et al. |
| 9,802,175 | B2 | 10/2017 | Kameno |
| 2011/0262734 | A1 | 10/2011 | Arfsten et al. |

FOREIGN PATENT DOCUMENTS

| CN | 102245693 | 11/2016 |
| EP | 2 407 521 | 1/2012 |
| FR | 2 790 264 | 9/2000 |
| JP | 2008-274261 | 11/2008 |
| JP | 2010-502795 | 1/2010 |
| JP | 2010-503033 | 1/2010 |
| JP | 2011-111558 | 6/2011 |
| JP | 2011111558 | * 6/2011 |
| JP | 2013-226539 | 11/2013 |
| WO | 2008/028640 | 3/2008 |
| WO | WO 2010/043653 | 4/2010 |

OTHER PUBLICATIONS

Machine English translation of JP 2008-274261, Amano et al., Nov. 13, 2008.*
International Search Report for PCT/EP2014/075402, dated Jan. 22, 2015, 4 pages.
Written Opinion of the ISA for PCT/EP2014/075402, dated Jan. 22, 2015, 7 pages.

* cited by examiner

*Primary Examiner* — Patrick D Niland
(74) *Attorney, Agent, or Firm* — Nixon & Vanderhye P.C.

(57) ABSTRACT

The invention relates to a process of making an anti-reflective coating composition comprising the steps of 1) preparing an oil-in-water emulsion by mixing an apolar organic compound A; a cationic addition copolymer C as emulsion stabilizer; and aqueous medium of pH 2-6; at a mass ratio C/A of 0.1 to 2, to result in 1-50 mass % (based on emulsion) of emulsified droplets of average particle size 30-300 nm; and 2) providing an inorganic oxide shell layer to the emulsified droplets by adding to the emulsion obtained in step 1) at least one inorganic oxide precursor, to result in organic-inorganic core-shell nano-particles with mass ratio core/shell of from 0.2 to 25. An advantage of this process is that the dispersion of nano-particles obtained is stable under different conditions, and allows altering its concentration and solvent system, and addition of different binders and auxiliary components. The invention also relates to a coating composition as obtained with said process, and to a process of applying a porous anti-reflective-coating on a substrate using such composition, and to the resulting coated substrate.

16 Claims, 3 Drawing Sheets

PROCESS FOR MAKING AN ANTI-REFLECTIVE COATING COMPOSITION AND A POROUS COATING MADE THEREFROM

FIELD

This application is the U.S. national phase of International Application No. PCT/EP2014/075402 filed 24 Nov. 2014, which designated the U.S. and claims priority to EP Patent Application No. 13194085.0 filed 22 Nov. 2013, the entire contents of each of which are hereby incorporated by reference.

The invention relates to a process for making an anti-reflective (AR) coating composition comprising the steps of preparing an aqueous dispersion of organic-inorganic core-shell nano-particles, and optionally adding an inorganic or organic polymeric or polymerisable compound as binder.

BACKGROUND AND SUMMARY

The invention also relates to a coating composition as obtained with said process, and to a process of applying a porous anti-reflective coating (ARC) on a substrate using such composition, and to the resulting coated substrate.

A typical example of an ARC is a thin layer of porous inorganic oxide —for example a layer of less than 0.2 µm thickness—which substantially consists of an inorganic oxide like silica and has certain porosity. Such coatings may be applied to a transparent substrate to reduce the amount of light being reflected from its surface, i.e. from the air-substrate interface, and thus increase the amount of light being transmitted through the substrate. Such coatings can be used as single layer or as part of a multi-layer coating (or coating stack). Typical single layer ARCs based on thin porous silica layers have been described in e.g. EP0597490, U.S. Pat. Nos. 4,830,879, 5,858,462, EP1181256, WO2007/093339, WO2008/028640, EP1674891, WO2009/030703, WO2009/140482, US2009/0220774, and WO2008/143429.

A single layer ARC on a transparent substrate typically should have a refractive index between the refractive indices of the substrate and air, in order to effectively reduce the amount of light reflected. For example, in case of a glass with refractive index 1.5 the AR layer typically should have a refractive index of about 1.2-1.3, and ideally of about 1.22. A porous silica (or other inorganic oxide) layer having sufficiently high porosity can provide such a low refractive index and function as AR coating, if its layer thickness is about ¼ of the wavelength of the light; meaning that in the relevant wavelength range of 300-800 nm the thickness preferably is in the range 70-200 nm.

Optimum porosity and pore size in an ARC is not only depending on the coating layer thickness, but also on other desired performance characteristics. For example, pore size should not be too large, to minimise light scattering and optimise transparency. On the other hand, if the layer contains very small pores, this may result—under ambient use conditions—in non-reversible moisture up-take via capillary condensation; affecting refractive index and making the coating layer more prone to fouling. Such capillary condensation effects have been reported for so-called mesoporous silica, especially having pores in the range 1-20 nm. Porosity is needed to reduce refractive index, but too high porosity level may deteriorate mechanical strength of the coating, e.g. reduce (pencil) hardness and abrasion resistance.

By inorganic oxide precursor is herein meant a compound that contains metal and can be converted into a metal oxide for example by hydrolysis and condensation reaction.

Porous AR coatings can be made from a solvent borne coating composition comprising an inorganic or organic binder material and a pore forming agent. In case of an inorganic binder, for example based on an inorganic oxide precursor, typically a sol-gel process is used for making a (porous) inorganic oxide layer, wherein a precursor compound in solution or colloid (or sol) form is formed into an integrated network (or gel) of either discrete particles or network polymers. In such process, the sol gradually evolves to a gel-like diphasic system containing both a liquid and solid phase. Removing remaining liquid (drying) is generally accompanied by shrinkage and densification, and affects final microstructure and porosity. Afterwards, a thermal treatment at elevated temperature is often applied to enhance further condensation reactions (curing) and secure mechanical and structural stability. Typical inorganic oxide precursors used are metal alkoxides and metal salts, which can undergo various forms of hydrolysis and condensation reactions. Metal is understood to include silicon within the context of this description.

Such AR coating composition contains solvent and organic ligands from organo-metallic inorganic oxide precursors, which compounds as such will induce some porosity to the inorganic oxide layer; but typically with pores smaller than 10 nm. The further presence of a pore forming agent in the coating composition will help in generating suitable porosity level and pore sizes in the final AR layer to provide the desired refractive index. Suitable pore forming agents, also called porogens, known from prior art publications include organic compounds, like higher boiling solvents, surfactants, organic polymers, and inorganic particles having sub-micron particle size, including porous particles and organic-inorganic core-shell nano-particles.

Use of porous or hollow nano-particles in a binder or matrix material represents an elegant way to control porosity level and pore sizes in a porous ARC layer. Various different synthetic strategies for making hollow inorganic particles can be distinguished, as for example described in Adv. Mater. 2008, 20, 3987-4019. A typical approach applies a micro- or nano-sized organic structure in a solvent system as a template or scaffold for forming an inorganic oxide outer layer (also referred to as coating with inorganic oxide), resulting in hybrid organic-inorganic core-shell (or coated) nano-particles as intermediate product. Shell layers comprising silica are generally made with a sol-gel process based on the so-called Stöber method, wherein an alkoxy silane is hydrolysed and condensed in water/alcohol mixtures containing ammonia.

A coating composition comprising pre-fabricated hollow inorganic nano-particles and a matrix-forming binder based on silica precursors is for example described in EP1447433. A disadvantage of this approach is that porous or hollow nano-particles, which can be re-dispersed in a liquid composition, are difficult to make.

Many documents address using organic-inorganic core-shell nano-particles with an organic polymer core as an alternative to making an AR coating composition. After applying and drying such coating composition on a substrate, the organic core can be removed from the coating by various methods; for example by exposing the coating to a solvent for the polymer and extracting it from the coating. Alternatively organic polymer can be removed during thermally curing the coating, for example at temperatures above the decomposition temperature of the polymer (i.e. by pyrolysis or calcination). Suitable temperatures are from about 250 to 900° C. A combined treatment of dissolving and degrading/evaporating the polymer may also be applied.

WO2008/028640 represents an example of a publication that describes applying such hybrid core-shell nano-particles with a sacrificial organic polymer core. In this document cationic polymer micelles or cationically stabilised polymer latex particles are used as organic template for making hybrid core-shell nano-particles and AR coating compositions comprising said core-shell particles and inorganic oxide precursor as binder. Thermally curing an applied layer results in a porous coating with in situ formed hollow particles embedded in the binder, wherein pore size is dependent on the size of the polymer template used for making the core-shell particles. A disadvantage of using nano-particles with a polymeric core is that for effective removal exposure to high temperatures may be needed, which limits its use with thermally sensitive substrate like thermoplastics.

JP 2011111558 discloses a coating composition where particles are based on a polymer emulsion particle based on polymerized vinyl monomer with a specific functional group, hydrolysable silicone compound, emulsifier and water.

JP2008274261 discloses a coating composition for forming a hollow silicone particle film. Examples show that the hollow silicone particles are prepared by first making a core of polymer particles using anionic or non-ionic emulsifiers and thereafter silicone precursors are added to form the shell, whereafter the core is removed by extraction or heating. A potential solution to above indicated thermal restrictions would include core-shell particles that have a more volatile core, for example comprising an organic compound with a boiling point below 300° C. Numerous research groups have published on synthesis and properties of hybrid core-shell particles and inorganic hollow nano-particles; see for example reviews such as Adv. Mater. 2008, 20, 3987-4019. Preparation of stable dispersions of suitable core-shell nano-particles based on low molar mass organic templates and having particle size well below about 500 nm appears however rather difficult.

Therefore, there remains a need in industry for an anti-reflective coating composition based on hybrid organic-inorganic core-shell nano-particles, which composition can be made into an ARC at relatively low temperatures, for example on thermally sensitive substrates.

It is thus an objective of the present invention to provide such an improved AR coating composition and a process of making it.

The solution to above problem is achieved by providing the process as described herein below and as characterized in the claims.

Accordingly, the present invention provides a process of making an anti-reflective coating composition comprising the steps of
1) Preparing an oil-in-water emulsion by mixing
   an apolar organic compound A;
   a cationic addition copolymer C as emulsion stabilizer; and
   aqueous medium of pH 2-6;
   at a mass ratio C/A of 0.1 to 2, to result in 1-50 mass % (based on emulsion) of emulsified droplets of particle size 30-300 nm; and
2) Providing an inorganic oxide shell layer to the emulsified droplets by adding to the emulsion obtained in step 1) at least one inorganic oxide precursor, to result in organic/inorganic core-shell nano-particles with mass ratio core/shell of from 0.2 to 25.

With the process of the invention it is found possible to make a coating composition comprising core-shell particles based on emulsified droplets that contain a liquid apolar organic compound and having an particle size in the range of 30 to 300 nm. This particle size can be controlled by the type of organic compound and the monomer composition of the cationic copolymer, and/or by selecting conditions like temperature, pH, aqueous medium composition, and to a lesser degree stirring rate. A further advantage of the present process is that the dispersion of core-shell nano-particles obtained is stable under different conditions; increasing its shelf life or storage time, and allowing for example altering its concentration and solvent system, and addition of different binders and auxiliary components. The coating composition obtained with the process according to the invention can be advantageously used for making porous ARCs at a wide range of temperatures on different substrates, including thermoplastic substrates that have low temperature resistance; because the organic compound can be easily removed from the core-shell particles by solvent extraction or evaporation at relatively low temperature, and low temperature curable binder can be used.

DETAILED DESCRIPTION

Figure 1:
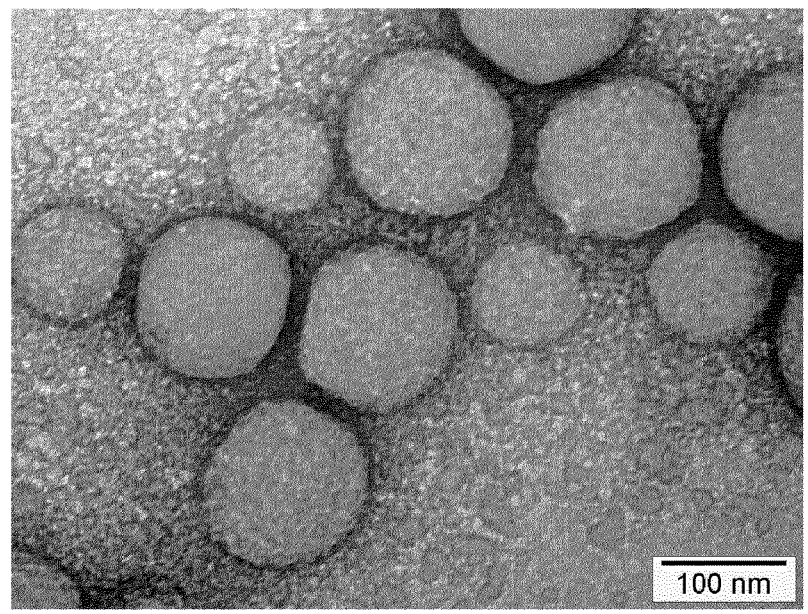
FIG. 1 is a TEM micrograph of the spherical silica particles obtained by Example 1 below.

The process according to the invention comprises a step 1) wherein an apolar organic compound A; a cationic addition copolymer C; and an amount of an aqueous medium of pH 2-6 are mixed at a mass ratio C/A of 0.1 to 2 to prepare an oil-in-water emulsion. The apolar organic compound A used herein is typically a liquid at temperatures above 0° C., preferably above 10 or 20° C. in order to make an oil-in water emulsion. Compound A preferably retains liquid character under conditions of making the emulsion, and during subsequent process and storage steps. On the other hand, it is an advantage that during making an ARC from the composition, especially during a curing step, compound A can be easily removed from the coating by evaporation to create porosity. Therefore, compound A has preferably a boiling point of at least 30, 40, 60, 80, or 100° C., and of at most 350, 300, 250, 200 or 150° C.

Compound A used in the process according to the invention has an apolar (or hydrophobic) character, meaning that it has solubility in water at room temperature of at most 5 kg/m$^3$ and can form a separate phase from water. Compound A is preferably a compound that can be dispersed in water in the presence of copolymer C as described hereinafter. Preferably compound A has a solubility in water at room temperature of at most 4, 3, 2, or 1 kg/m$^3$.

It is highly preferred that compound A is non-polymeric. By non-polymeric is herein understood that A is not build from more than 2 repeating monomer units as it was found that particularly for applications where high temperature curing is not acceptable, it may require extended time to extract or evaporate compound A from the core-shell nano particles when compound A is a polymer.

Compound A preferably is inert with regard to other components used in the process or composition of the invention. In a special way of operating the process according to the invention compound A may be reactive with the binder that is added in step 3) of the process as described hereafter; especially in case the aqueous medium of the final coating composition differs from that in step 1) and contains e.g. more organic solvent, and compound A shows enhanced solubility therein as compared to the aqueous medium during making the emulsion. In such case compound A may be partially extracted from the dispersed core-shell particle into the medium that may also contain binder. Compound A may for example be an unsaturated compound that can co-react with organic polymerisable binder during curing of a coating layer.

Examples of apolar compound A include hydrocarbon compounds, fatty acids, alcohols, esters, ethers, vinyl compounds, and the like. Suitable examples include cyclohexane, decane, toluene, trimethyl benzene, isoamyl acetate, C8-C22 alcohols, styrene, alkyl (meth)acrylates, butanediol dimethacrylate, hexanediol dimethacrylate, and the like.

In the process according to the invention one compound may be used as compound A, but also a mixture of compounds as defined above may be applied. It is also possible to use a compound A wherein a minor amount, for example less than 4, or 2 mass %, of a hydrophobic compound not satisfying above definition is dissolved, which may aid in dispersing compound A. An example of a suitable mixture is cyclohexane containing 1 mass % of heptadecane.

In step 1) of the process according to the invention an oil-in-water emulsion is prepared of compound A and a cationic addition copolymer C. Copolymer C comprises at least one monomer unit having a cationic charge and at least one neutral or non-ionic monomer, preferably an apolar monomer of which the corresponding homopolymer shows limited or no solubility in water. Overall, the cationic copolymer should have a positive zeta potential. Preferably, cationic copolymer C is not readily soluble in water, but tends to form colloidal aggregates, which enhances its functioning as emulsion stabilizer. The copolymer may be a random, but also a block copolymer, and may comprise styrenic, acrylic, methacrylic, olefinic, and/or vinylic comonomers. Within the context of this application all these monomers are together referred to as ethylenically unsaturated monomers or vinyl monomers; that is including a.o. methacrylates which comprise a methyl-vinyl group. Acrylic and methacrylic compounds are together typically referred to as (meth)acrylic monomers in the art. The addition copolymer can advantageously be made using various polymerisation techniques as known to a skilled person, and from a great number of suitable vinyl monomers; offering a wide range of compositions for the copolymer. Suitable examples include bulk, solution and emulsion polymerisations using radical initiators. The copolymer is preferably provided as dispersion in aqueous medium, which may have resulted from an emulsion polymerisation of selected monomers, but also from polymerisation in organic solvent followed by dispersing the copolymer obtained in aqueous medium and optionally neutralising non-ionic functional groups; as is known in the art.

JP2011111558 does not disclose the presence of a component A in the core that fall within or even function as the component A disclosed in the present invention, but only the use of a polymer core. Furthermore, the emulsion stabilizer C in the form of a cationic addition copolymer is also not disclosed.

JP208274261 suggests in the description that solvent may be present with the polymer or even replace the polymer in the core of the core-shell particles of JP208274261. However, there is no enabling disclosure of even the presence of solvent in the core and particularly no enabling disclosure that it would be possible to prepare a core-shell nano particle without the presence of a polymer of the types indicated in JP208274261 in the core. Furthermore, JP208274261 does not disclose the use of emulsion stabilizer C in the form of a cationic addition copolymer.

In the process according to the invention copolymer C is preferably a copolymer obtained from
- at least one cationic or basic monomer (M1), including compounds with a pending group that can combine with a proton to later form a cationic group; like monomers with a tertiary amine group;
- at least one neutral or non-ionic monomer (M2); preferably an apolar monomer of which the corresponding homopolymer is not readily soluble in aqueous medium; and
- optionally at least one polar, anionic or acidic monomer (M3).

Cationic comonomer M1, and optionally M3 will increase solubility and dispersability of the copolymer in an aqueous system; whereas non-ionic monomer units M2 will reduce water solubility, and promote forming aggregates and activity as emulsion stabilizer or polymeric surfactant, by non-polar or hydrophobic interactions. Too high an amount of M2 may result in insolubility and/or precipitation of the copolymer in an aqueous medium. The type and amount of comonomers is thus preferably chosen such that the copolymer can be dispersed in an aqueous medium into colloidal particles. It is an advantage of present invention that random copolymers of such monomers can already function as emulsion stabilizers in an aqueous medium; thus omitting the need for using more complex synthetic routes of making block copolymers. The skilled person will be able to select a suitable copolymer composition, also depending on the compound A to be emulsified and composition of the aqueous medium.

In a preferred embodiment, the copolymer C used in the method according to the invention is a copolymer obtained from
- 1-25 mole % of at least one monomer M1;
- 50-99 mole % of at least one monomer M2; and
- 0-25 mole % of at least one monomer M3 (with the sum of M1, M2, and M3 adding up to 100%).

If a comonomer M3 is used in preparing the copolymer, especially an anionic M3, monomer M1 is used in such amount, for example in a molar excess over M3, to result in an ionic copolymer having a net positive charge.

Preferably, the copolymer used in the process according to the invention is a cationic copolymer obtained from
- 5-15 mole % of at least one monomer M1;
- 75-95 mole % of at least one monomer M2; and 0-10 mole % of at least one monomer M3.

In further preferred embodiments, the copolymer used in the process according to the invention is such a cationic copolymer obtained from at least 5, 6, 7, 8, 9 or 10 mole %, and at most 25, 20, 15, 12 or 10 mole % of at least one monomer M1; and at least one monomer M2 in such amount that the sum of M1 and M2 is 100 mole %.

Cationic monomers M1 that can be suitably used in forming copolymer C used the process according to the invention via addition polymerisation include vinyl monomers with a pending amino functional group; which can be non-ionic monomers that can be neutralised during or after forming the copolymer, monomers with an already neutralised amino functional group, or vinyl monomers with a permanent quaternary ammonium group.

Examples of vinyl monomers bearing non-ionic amino functional groups include N,N-dimethylaminoethyl (meth) acrylate, N,N-dimethylaminohexyl (meth)acrylate, N,N-diethylaminoethyl (meth)acrylate, N-methyl-N-butyl-aminoethyl (meth)acrylate, tert-butylaminoethyl (meth)acrylate, N,N-dimethylaminopropyl (meth)acrylate, 2-(1,1,3,3,-tetramethylbutylamino)ethyl (meth)acrylate, beta-morpholinoethyl (meth)acrylate, 4-(beta-acryloxyethyl) pyridine, vinylbenzylamines, vinylphenylamines, 2-vinylpyridines or 4-vinylpyridines, p-aminostyrenes, dialkyaminostyrenes such as N,N,-diaminomethylstyrene, substituted diallylamines, N-vinylpiperidines, N-vinylimidazole, N-vinylimidazoline, N-vinylpyrazole, N-vinylindole, N-substituted (meth)acryl amides like 2-(dimethylamino)ethyl (meth) acrylamide, 2-(t-butylamino)ethyl (meth)acrylamide, 3-(dimethylamino)propyl (meth)acrylamide, (meth)acryl amide, N-aminoalkyl (meth)acrylamides, vinyl ethers like 10-aminodecyl vinyl ether, 9-aminooctyl vinyl ether, 6-(diethylamino)hexyl vinyl ether, 5-aminopentyl vinyl ether, 3-aminopropyl vinyl ether, 2-aminoethyl vinyl ether, 2-aminobutyl vinyl ether, 4-aminobutyl vinyl ether, 2-dimethylaminoethyl vinyl ether, N-(3,5,5,-triethylhexyl)aminoethyl vinyl ether, N-cyclohexylaminoethyl vinyl ether, N-tert-butylaminoethyl vinyl ether, N-methylaminoethyl vinyl ether, N-2-ethylhexylaminoethyl vinyl ether, N-t-octylaminoethyl vinyl ether, beta-pyrrolidinoethyl vinyl ether, or (N-beta-hydroxyethyl-N-methyl) aminoethyl vinyl ether. Cyclic ureido or thiourea containing ethylenically unsaturated monomers like (meth)acryloxyethyl ethyleneurea, (meth)acryloxyethyl ethylenethiourea (meth)acrylamide ethyleneurea, (meth)acrylamide ethylenethiourea and alike can also be used. Preferred monomers are amino-functional (meth)acrylates and (meth)acrylamides; especially N,N,-dialkylaminoalkyl (meth)acrylates, more specifically t-butylaminoethyl methacrylate, dimethylaminopropyl methacrylate, dimethylaminoethyl methacrylate (DMAEMA) or diethylaminoethyl methacrylate (DEAEMA), more preferably DMAEMA and DEAEMA.

The above given examples of suitable and preferred M1 monomers can also be used in their ionised form, by treating with for example an acid, preferably an organic acid like a carboxylic acid, prior to polymerisation.

Suitable examples of M1 monomers with a permanent quaternary ammonium group include methacrylamidopropyl trimethylammonium chloride (MAPTAC), diallyl dimethyl ammonium chloride (DADMAC), 2-trimethyl ammonium ethyl methacrylic chloride (TMAEMC) and quaternary ammonium salts of substituted (meth)acrylic and (meth)acrylamido monomers.

Neutral or non-ionic monomers M2 that can be suitably used in forming the copolymer used the process according to the invention via addition polymerisation include a wide range of ethylenically unsaturated monomers or vinyl monomers, including various styrenic, (meth)acrylic, olefinic, and/or vinylic comonomers. The at least one monomer M1 is preferably hydrophobic. Preferably, the cationic copolymer comprises a certain amount of non-water soluble or hydrophobic comonomers that will promote the copolymer, not being fully water soluble, to self-assemble into colloidal particles or aggregates in an aqueous medium. The skilled person will be able to select suitable combinations of monomers and their contents based on the information disclosed in this description and experiments, possibly assisted by some further experiments; and depending on copolymer composition (like M1 and M2 types and amounts), conditions (like solvent composition, temperature, pH), and type of compound A.

Suitable styrene monomers M2 include styrene, alpha-methyl styrene and other substituted styrenes. Suitable (meth)acrylic monomers M2 include alkyl or cycloalkyl (meth)acrylates, preferably $C_1$-$C_{18}$ alkyl (meth)acrylates or $C_1$-$C_8$ alkyl (meth)acrylates, like methyl (meth)acrylate, ethyl (meth)acrylate, butyl (meth)acrylate (all isomers), isobutyl (meth)acrylate, 2-ethylhexyl (meth)acrylate, isopropyl (meth)acrylate, propyl (meth)acrylate (all isomers), or isobornyl (meth)acrylate. Most preferred (meth)acrylic monomers include methyl methacrylate (MMA), ethyl methacrylate (EMA), n-butyl methacrylate (BMA). Similarly, N-alkyl (meth)acrylamides can be used as monomer M2. Also other monomers that can be copolymerized with M1 can be used as monomer M2, including butadiene; vinyl monomers like vinyl chloride, vinyl laurate, vinyl alkyl ethers, and the like.

As monomer M3 various compounds that can be copolymerized with M1 and M2 can be used, including acrylonitrile, methacrylonitrile, vinyl monomers like vinyl pyrrolidone, vinyl esters such as vinyl acetate or vinyl propionate, and the like. Also anionic or acidic monomers M3 may be used in forming the copolymer used in the method according to the invention; like monomers with a pending phosphoric, sulfonic, or carboxylic acid group. Suitable monomers include vinyl monomers with a carboxylic acid group, examples being ethylenically unsaturated monocarboxylic and/or dicarboxylic acids, like fumaric acid, itaconic acid, maleic acid, and especially (meth)acrylic monomers with a carboxylic acid group, such as acrylic acid (AA), methacrylic acid (MAA) and β-carboxy ethylacrylate. A copolymer comprising both anionic and cationic groups can be referred to as a polyampholyte. Resulting intra- and intermolecular interactions between the ionic groups may enhance their functioning as emulsion stabilizer in the process of the invention.

In a preferred embodiment of the process according to the invention, the cationic copolymer is obtained from 5-15 mole % of at least one monomer M1 selected from the group consisting of amino-functional (meth)acrylates and (meth) acrylamides; and 85-95 mole % of at least one monomer M2 selected from the group of C1-C18 alkyl (meth)acrylates.

In a further preferred embodiments of the process according to the invention, a cationic copolymer is applied which is obtained from 5-10 mole % of dimethylaminoethyl methacrylate (DMAEMA) as monomer M1, and 90-95 mole % of MMA as monomer M2; or a copolymer made from 5-12 mole % of DMAEMA and 88-95 mole % of isobornyl acrylate (IBOA).

In the process according to the invention the molar mass of copolymer C can vary widely. Typically, the copolymer has a weight averaged molar mass (Mw) in the range 1-500 kDa (kg/mol), preferably Mw is at least 2, 5, 10, 15 or even 20 kDa, but at most 250, 200, 150, 100, 50 or even 40 kDa to optimise activity as emulsion stabilizer. The molar mass of the copolymer can be determined by gel permeation chromatography (GPC) using polymethylmethacrylates of known molar masses as a standard and hexafluoro iso-propanol as a solvent.

In step 1) of the process according to the invention an oil-in-water emulsion is prepared by mixing compound A and copolymer C in an aqueous medium of pH 2-6, resulting from organic and/or inorganic acid or buffer compounds being present. Within this pH range the copolymer C will be cationically charged, also if M1 monomer has a (neutralized) tertiary amine pending group. Temperature for mixing is not critical, but is generally from ambient to about 50° C.

By aqueous medium is herein meant a liquid comprising water. The aqueous medium may in addition to water comprise at least one organic solvent that can be dissolved in or is miscible with water, like alcohols, ketones, esters, or ethers. Examples include 1,4-dioxane, acetone, diethyl acetate, propanol, ethanol, methanol, butanol, methyl ethyl ketone, methyl propyl ketone, and tetrahydrofuran. Preferably, the aqueous medium comprises water and a lower (C1-C8) aliphatic alcohol, like methanol, ethanol, iso-propanol or 1-methoxypropan-2-ol; more preferably ethanol or iso-propanol. If organic solvent is present, its amount is chosen such that compound A and copolymer C will not be dissolved, securing formation of emulsified droplets of compound A and copolymer C. Preferably the amount of organic solvent is at most 10 mass %, more preferably at most 8, 6 or 4 mass % (based on total composition). Preferably the solvent composition of the aqueous medium is also suitable for the subsequent step 2) of forming a shell layer.

In the process according to the invention the manner and order in which components A and C are added to and mixed with the aqueous medium is not particularly critical. For example compound A and copolymer C may be added simultaneously or sequentially, optionally under stirring. Formation of emulsified droplets may be facilitated by stirring, for example with a stirring bar at relatively low speed, with a high-speed mixer, with a high-pressure homogenizer, or with sonication. The actual stirring rates (or similar settings when using alternative mixing devices as exemplified above) can vary and is chosen to realize an oil-in-water emulsion as determined by routine experimentation by the skilled person.

In the step of preparing an oil-in-water emulsion by mixing organic compound A and copolymer C in aqueous medium the mass ratio of C to A is from 0.1 to 2. A certain minimum amount of cationic copolymer is needed to stabilize the emulsion, but also to provide the emulsified droplets with a certain charge level relevant for forming a shell layer of at least partially reacted inorganic oxide precursor in subsequent step 2). Too high an amount of copolymer, that is a relatively low amount of compound A, could reduce potential porosity level that can be formed in a coating layer from the composition as obtained. Mass ratio C/A is therefore preferably at least 0.15, 0.2, 0.3 or 0.4, and at most 1.5, 1.2, 1.0, 0.9, 0.8, 0.7, 0.6 or 0.5.

If desired, in the process according to the invention a further conventional surfactant of low molar mass may be added in step 1), to assist formation of dispersed droplets and to further stabilise the emulsion obtained. The surfactant used may be non-ionic, cationic or anionic, or a combination thereof. Preferably none, or only small amount of surfactant is used, like 0.1-3, more preferably 0.2-1.5 mass %.

The process of the invention results in step 1) in a dispersion of 1-50 mass % of emulsified droplets (based on total emulsion). The emulsion may be prepared with a wide range of concentration of emulsified particles, depending subsequent steps and uses. Generally a relatively high concentration is preferred in step 1), allowing further dilution with water or other solvents as required during subsequent steps. Preferably, a dispersion is made in step 1) containing at least 2, 4, 6, 8 or 10 mass % of emulsified droplets, and at most 40, 30, 25 or 20 mass %. Based on the information provided above, the skilled person can determine the relative amounts of compound A, copolymer C, aqueous medium and optionally other compounds to be used in the process.

The process of the invention results in step 1) in a dispersion of emulsified droplets of particle size 30-300 nm. Formation and size of emulsified droplets can be monitored by various techniques; for example by Dynamic Light Scattering (DLS). In view of using the composition obtained with the process according to the invention to make an AR coating, variables of the process as described above are chosen such that particle size is preferably at least 35, 40, 45 or 50 nm, and at most 250, 200, 175, 150 or 125 nm (as measured with DLS).

The process of the invention comprises a step 2) of providing an inorganic oxide shell layer to the emulsified droplets, by adding to the emulsion obtained in step 1) at least one inorganic oxide precursor to result in organic/inorganic core-shell nano-particles with mass ratio core/shell of from 0.2 to 25. The core is here the sum of compound A and emulsion stabilizer C and shell is $SiO_2$ equivalent of inorganic oxide precursor. By metal oxide equivalent of inorganic oxide precursor is here meant the mass of oxides that the precursors is converted to by complete conversion into metal oxides, such as TMOS and TEOS each counting as one $SiO_2$, titanium tetraisopropoxide counting as one $TiO_2$ and aluminium nitrate counting as a half $Al_2O_3$. In the step 2) of the process according to the invention, the emulsified droplets act as template on which a shell layer is formed from sol particles of partially reacted precursor. Such formation of an inorganic shell layer by a sol-gel process has been described in many publications, including documents cited in this application, and publications referenced therein. Suitable inorganic oxide precursors include metal salts, metal chelates and organo-metallic compounds, preferably metal alkoxides, and combinations thereof. Such compounds can undergo various hydrolysis and/or condensation reactions in aqueous medium to finally form corresponding oxides or mixed oxides. Within the present application silicon (Si) is considered to be a metal. Suitable metals include Si, Al, Bi, B, In, Ge, Hf, La and lanthanoids, Sb, Sn, Ti, Ta, Nb, Y, Zn and Zr, and mixtures thereof. Preferably the metal is at least one of Si, Al, Ti, and Zr. Preferred precursors include alkoxy silanes, preferably tetra- or tri-alkoxy silanes like tetramethoxy silane (TMOS), tetraethoxy silane (TEOS), methyltrimethoxy silane, methyltriethoxy silane, titanium tetraisopropoxide, aluminium nitrate, aluminium butoxide, yttrium nitrate and zirconium butoxide. Such precursor compounds can be partially pre-reacted or pre-hydrolysed to form oligomeric species, typically in the form of nano-sized particles of about 1-20, 1-10 or even 1-5 nm; also called sol particles.

In a preferred embodiment of the invention, the at least one inorganic precursor comprises an alkoxy silane, more preferably TMOS and/or TEOS. Preferably, the shell layer formed substantially consists of silica (precursor) as inorganic oxide; the shell for example comprises at least 80, 85, or 90 mole % of Si as metal in the inorganic oxide, more preferably at least 95 mole % of Si.

In the process according to the invention the step of forming a shell layer from the precursor on the template to result in core-shell nano-particles is typically performed under mild conditions. As mentioned above, the aqueous medium may comprise an organic solvent that is miscible with water, like alcohols, ketones, esters, or ethers; preferably an alcohol like methanol, ethanol or iso-propanol. Water serves as solvent or diluent for the composition, but will also react with the inorganic oxide precursor; for example with an alkoxy silane. The amount of water present in the composition is therefore at least the amount needed for such desired reaction(s), like (partial) hydrolysis of for example tetraethoxy silane. In case complete hydrolysis of TEOS would be aimed at, the composition should contain water in at least a 4:1 molar ratio to Si.

The temperature is not very critical in this step of the process of the invention and can be varied widely as long as the emulsion is not disrupted. Temperature can be up to 100° C., but is typically ambient, i.e. from about 15 to 40° C. As said hydrolysis reaction is exothermic, cooling may be used to control temperature in this step. The pH is in the range 2-6, preferably 3-5 or 3-4.5. An advantage of applying such conditions is that nanoparticles formed from the precursor typically having a negative charge and will at least partly deposit on the outside of emulsified droplets of opposite charge. This way an open or 'fluffy', or more condensed layer of inorganic oxide (precursor) may form around the emulsion particles, depending on reaction conditions.

In the process according to the invention forming a shell layer from the precursor on the template droplets is performed at such mass ratio of inorganic oxide precursor to organic template that organic/inorganic core-shell nano-particles with mass ratio core/shell of from 0.2 to 25 result. It is preferred that the mass ratio core/shell is from 0.2 to 5 and particularly from 0.2 to 2. More preferably, the process results in core-shell nano-particles with mass ratio core/shell of 0.3-2, more preferably 0.4-1.8. The high mass ratio of core/shell such as 2 to 25 and particularly from 4 to 23 is particularly advantageous when no separate binder addition step 3) is included in the method according to the invention. In this case, oxide precursor added in step 2) may also act as an integrated binder, in the sense that some of the oxide precursor will form the shell of the core-shell nano particles and some of the oxide precursor will remain unbonded or only very loosely bonded to the nano particles and during preparation of the ARC will act as a binder.

Formation of a shell layer from the precursor on the template may be monitored by measuring change in dimensions of the emulsified droplets, eg. by DLS. Although the DLS technique has its draw-backs, for example mainly detecting the larger particles, and particle size may also change as result of compounds liberated from the precursor, like an alcohol, which could be absorbed in the core, it is a simple and convenient method to observe shell formation. Shell formation may slow down or stop when the net charge of the emulsified core particle has decreased by the inorganic oxide (precursor) having charge opposite to that of the copolymer. A certain charge level will likely remain to keep the particles dispersed. As shell formation is thought to result from complexing of inorganic nanoparticles with the outer layer of emulsified droplet comprising cationic copolymer, an open or fluffy structure is expected to be formed in the aqueous medium rather than a dense shell (as in dried particles).

In embodiments of the process according to the invention the structure of the shell formed, like its density or surface properties, may be further optimized by extending reaction time, reacting with a coupling agent or other treatment as known from the art. Thickness of the shell layer thus formed is typically in the range of 1-20 nm, preferably 2-10 nm. Shell thickness of core-shell nano-particles, and their morphology can be assessed on particles with techniques like TEM, especially cryo-TEM, SAXS, or SANS. Considering the relatively thin shell layer, particle size of the core-shell particles is in ranges similar to those of the emulsified droplets.

With the process according to the invention dispersed core-shell nano-particles are obtained, which composition is found to show remarkably good storage and handling stability, meaning the composition shows little tendency to changing viscosity or gelling compared to other sol-gel process based dispersions. It was further found that the solids content of the dispersion may be adjusted by evaporation or dilution with water or organic solvent like an alcohol; which greatly increases the possibilities for adjusting composition to match requirements for coating applications.

The process according to the invention preferably comprises a further step 3) of adding 2-70 mass % of at least one polymeric or polymerisable compound as binder (mass % based on the sum of core-shell particles and binder). In principle the composition obtained after step 2) can be used to form an ARC on a substrate, showing a certain level of adhesion to the surface of the substrate after drying and optionally curing, resulting from further reaction of the inorganic oxide precursor, which generally has not fully reacted during preparing the shell layer. Preferably, a binder is added in step 3) to the AR coating composition, which binder can be at least one inorganic or organic polymeric or polymerisable compound. In forming an ARC from the composition, the binder may act as film former and hold together the core-shell nano-particles, resulting in improved mechanical properties of the coating formed and in better adhesion to a substrate upon drying and/or curing. Addition of binder will reduce the level of porosity of a coating made from the composition. Thus in step 3) of the process preferably at least 2, 5, 10, 15, 20, or 25 mass % of binder is added; but at most 65, 55, 50, 40, or 30 mass % (based on the sum of core-shell particles and binder) of binder is used.

Suitable organic binders in the process according to the invention include a range of different polymers and thermally or radiation—e.g. UV—curable monomers, as known to the skilled person. Organic binders, especially radiation curable binders generally have the advantage that they can be cured at relatively low temperatures of preferably below 250° C., compatible with e.g. thermoplastic substrates, and at which also the organic compound A may be evaporated from the nano-particles to in situ create hollow particles. Use of inorganic binders may be preferred to result in coatings with improved mechanical properties and durability, but often requiring curing at elevated temperatures of about 250-900° C. It is an advantage of present invention that the process allows the skilled person to select and use a binder that provides the properties desired for a certain application of the coating. Examples of suitable organic binders that may be applied include radical curable—peroxide- or photo-initiated—compositions comprising vinyl monomers and vinylpolymers having unsaturated groups, like acrylates, methacrylates, maleate/vinyl ethers, etc.), or radical curable unsaturated polyesters or polyurethanes in styrene and/or (meth)acrylates.

Suitable inorganic binders in the process of making an AR coating composition of the invention include inorganic oxide precursors like metal alkoxides, metal chelates, metal salts, and mixtures thereof. Suitable metals include at least one element selected from Si, Al, Be, Bi, B, Fe, Mg, Na, K, In, Ge, Hf, La and lanthanoids, Sb, Sn, Ti, Ta, Nb, Y, Zn and Zr; preferably the metal is at least one element selected from Si, Al, Ti, and Zr. Suitable inorganic oxide precursors include those compounds that can react via hydrolysis and/or condensation reactions to form the corresponding oxide, as is well known in the art. The inorganic oxide precursor (which in the context of the present invention is considered polymerisable through for example hydrolysis and/or condensation, or polymerized in a glass, sol-gel or crystal stage) can be a metal salt or an organo-metallic compound, like an alkoxy, an aryloxy, a halogenide, a nitrate, or a sulphate compound, and combinations thereof. Preferred precursors include alkoxy silanes, including halogenated—especially fluorinated—derivates, like tetramethoxy silane (TMOS), tetraethoxy silane (TEOS), methyltrimethoxy silane, methyltriethoxy silane, fluoroalkoxy silanes like trifluoropropyl trimethoxy silane, titanium tetraisopropoxide, aluminium nitrate, aluminium butoxide, yttrium nitrate and zirconium butoxide. More preferably, the precursor comprises TMOS and/or TEOS.

The inorganic oxide precursor can be a mixture of inorganic oxide precursor compound and corresponding inorganic oxide. Such mixture may for example result in case a precursor compound partially pre-reacts or pre-hydrolyses in aqueous medium during making the composition to form oligomeric species, typically in the form of nano-sized particles; which is a well-known procedure in sol-gel technology.

In a further preferred embodiment, the binder used in the process of the invention comprises a mixture of different inorganic oxide precursors, in which case typically a mixed inorganic oxide is formed as is known for e.g. different glasses. In such mixed oxide the elements are connected via oxygen atoms to form part of an ionic or covalent network, rather than that they are present as a physical mixture of different oxides. Within the context of the present disclosure, mixed inorganic oxide refers to such definition. Formation of a mixed oxide may e.g. be determined by assessing changes in iso-electric point of oxides—e.g. in the form of thin layers—formed from different compositions, or by analytical techniques, like IR and solid-state NMR. Nevertheless, it is customary in the art to define the composition of such mixed inorganic oxide by the theoretical amounts of inorganic oxide for each metal present; e.g. the composition of an aluminosilicate made from Si- and Al-oxide precursors is typically expressed in silica and alumina contents. In case of a mixed oxide as binder, a main metal element is preferably selected from Si, Al, Ti, and Zr, and a second element selected from Si, Al, Be, Bi, B, Fe, Mg, Na, K, In, Ge, Hf, La and lanthanoids, Sb, Sn, Ti, Ta, Nb, Y, Zn and Zr; with a molar ratio of main to second element of about 75:25 to 99:1.

Preferably, the binder used in step 3) of the process comprises a mixture of a silica precursor and a precursor for Al-oxide or Y-oxide, as the mixed oxide formed shows high outdoor resistance or durability.

The process according to the invention may also comprise adding a combination of inorganic and organic binders, to for example further improve properties of the resulting coating, like anti-fouling behaviour, or enhance adhesion to the substrate. These binders may form polymers or networks on their own, but can also co-react.

In a preferred embodiment, the binder used in the process according to the invention consists of at least one inorganic oxide precursor.

The process according to the invention may optionally comprise a further step of adding at least one auxiliary component, which typically is a non-volatile or solid component. Preferably, auxiliary components are added in an amount of less than 20 mass % based on the sum of core-shell particles and binder, more preferably less than 10 or 5 mass %. These components may be added to assist in processing of the coating composition or to affect other functionalities of the coating to be made from the composition. Examples of auxiliary components include acids, buffer agents, catalysts, coupling agents, surfactants, antifoaming agents, chelating agents, slip agents, thickening agents, and leveling agents.

The process according to the invention optionally comprises a further step of adjusting the solids content of the coating composition by removing or adding water and/or organic solvent. The AR coating composition made with the process of the invention typically has solids content of less than about 20, 15, 10, 5 or even 3 mass %, and a minimum solids content of about 0.1 mass %, preferably at least 0.2, 0.5 or 1.0 mass %. Within the context of this application solids content means the total of components added excluding compound A, water and organic solvents, that is the sum of copolymer C, inorganic oxide precursor, binder and auxiliary components.

The composition made with the process of the invention comprises water and organic solvent as defined above, water and organic solvent are together also referred to as solvent. The solvent of the coating composition obtained with the process is a liquid component that contains the other coating components in dissolved, dispersed or colloidal states, and could thus also be referred to as diluent. The amount of solvent can be varied to obtain a desired viscosity of the coating composition, which viscosity may be relatively low to allow easy application to a substrate in thin films, e.g. for use as AR coating. Typically the viscosity of the coating composition is at least about 0.6 mPa·s, preferably at least 1.0 or 2.0 mPa·s. Depending on the deposition technology applied, the viscosity may as high as 1000 mPa·s. Preferably viscosity is at most 500, 300 or 200 mPa·s. for making thin layers of homogeneous thickness. The viscosity can be measured with known methods, for example with an Ubbelohde PSL ASTM IP no 1 (type 27042) especially for low viscosity ranges, or with a Brookfield viscometer. Solids content may be adjusted by removing solvent by e.g. evaporation or by adding solvent.

In a further preferred aspect of the process according to the invention the pH of the coating composition obtained is changed to a level at which inorganic oxide and/or its precursor—present in core-shell particles and/or as binder—will not react, including reacting at least only very slowly, to prevent agglomeration of core-shell particles and premature curing of binder; in case of silica precursors preferably to a pH of about 2-3, or even below 2 (as measured with a standard pH electrode on aqueous or alcoholic dispersion). This way the process results in a composition with favourable storage properties and extended shelf-life. For adjusting pH an inorganic or organic acid may be added, like nitric acid solution.

Storage at temperature of below room temperature, more preferably below 15 or 10° C. but above freezing temperature, will also increase shelf-life of the coating composition obtained.

The above described steps of the process according to the invention are typically performed at ambient pressure, but the skilled person will realise that increased (or reduced) pressure may also be applied.

The invention further relates to an AR coating composition obtained with the process according to the invention as described hereinabove, including all combinations and perturbations of indicated steps, components, features and embodiments.

In a further aspect the invention also relates to a process for making an ARC on a transparent substrate comprising the steps of
applying the coating composition according to the invention or obtained with the process according to the invention to the substrate; and
drying and curing the applied coating layer.

The transparent substrate on which the coating composition according to the invention can be applied may vary widely, and can be organic or inorganic and of various geometries. Preferably, the substrate is transparent for at least visible light. Suitable substrates include inorganic glasses (e.g. borosilicate glass, soda lime glass, glass ceramic, aluminosilicate glass) and plastics (e.g. PET, PC, TAC, PMMA, PE, PP, PVC and PS) or composite materials like laminates. Preferably the substrate is a glass, like borosilicate glass; preferably a flat glass like float glass with smooth or patterned surface.

The coating composition of the invention can be applied directly to the substrate, but also to another coating layer already present on the substrate; like a barrier layer for alkali ions, an adhesion promoting layer, a hard coat layer, or a layer having a higher refractive index (than the substrate).

The process according to the invention may also apply more than one coating layer, preferably with intermediate drying performed after the application of each layer. In some embodiments, intermediate drying and curing is performed after applying some or all of the layers.

In the process according to the invention the AR coating composition can be applied to the substrate with various deposition techniques, as known to a skilled person for making thin homogeneous coating layers. Suitable methods include spin-coating, dip-coating, spray-coating, roll-coating, slot die-coating, aerosol coating and the like. Preferred methods are dip-coating, roll-coating and slot die-coating. The thickness of the wet coating layer to be applied depends on the amount of solid film forming components in the coating composition, and on the desired layer thickness after subsequent drying and curing. The skilled person will be able to select appropriate methods and conditions depending on the situation.

The coating composition is preferably applied to the substrate for making a single layer AR coating in such wet thickness that will result in a thickness after drying and/or curing of about 20 nm or more, preferably the applied cured coating has a layer thickness of at least about 50 or 70 nm and of at most about 200, 180, 160 or 140 nm. In case of a multi-layer coating the skilled person may select different layer thicknesses.

In the coating process according to the invention the step of drying and curing the applied coating composition will comprise drying to evaporate at least part of the solvent and other volatile components including compound A, and then curing to complete reaction of the binder into for example inorganic oxide(s), and removing residual volatiles and optionally non-volatile organic components like the copolymer; depending on curing temperature.

Drying preferably takes place under ambient conditions (e.g. 15-30° C.), although elevated temperatures (e.g. up to about 250° C., more preferably up to 100, 50 or 40° C.) may also be used to shorten the total drying time. Drying may be promoted by applying an inert gas flow, or reducing pressure. Specific drying conditions may be determined by a person skilled in the art based on components to be evaporated.

During drying also compound A and/or organic solvent contained in the dispersed core-shell particles may at least partly be removed; resulting in porous or hollow particles. It is a specific advantage of the invention that an AR coating can be made at relatively low temperature, allowing use of substrates with limited thermal resistance, like plastic substrates. In such way of performing the process of the invention, also the curing step is performed at a temperature compatible with the substrate. After curing a substrate provided with a porous coating and showing AR properties is thus obtained.

Preferably the applied layer is cured after drying, i.e. after substantially removing volatiles. Curing may be performed using a number of techniques including thermal curing, flash heating, UV curing, electron beam curing, laser-induced curing, gamma radiation curing, plasma curing, microwave curing or combinations thereof. Curing conditions are depending on the coating composition and curing mechanism of the binder, and on the type of substrate. The skilled person is able to select proper techniques and conditions. Thermally curing coatings at e.g. temperatures above 250° C. is preferred for inorganic oxide precursors as binder to result in e.g. better mechanical properties. Such conditions are often not possible for curing a plastic substrate in an oven; and also not needed to generate a desired porosity level with the AR coating composition of the invention. If high temperature curing is desired, a surface heating technique like flash heating may advantageously be applied to minimise exposure of the substrate to high temperature; as is for example described in WO2012037234.

In a preferred way of operating the process of the invention, curing is performed at a temperature of at most 300° C., more preferably at most 250, or 200° C. After curing the coating, residual organics including copolymer C can be optionally further removed by known methods; for example by exposing the coating to a solvent and extracting the organic compound from the coating.

Alternatively, especially in case of inorganic binder and glass substrate, curing may be performed by heating at temperatures from about 250 to 900° C., preferably above 300, 400, 450, 500, 550 or 600° C., during at least several minutes. Such heating above the decomposition temperature of organic compound or polymer will remove such compounds to result in porosity, and also promote formation of oxides from inorganic oxide precursors, especially when in the presence of oxygen; resulting in both curing and removing organics by calcination. In case of an inorganic glass substrate curing can be performed at relatively high temperatures; of up to the softening temperature of the glass. Such curing by heating is preferably performed in the presence of air, and is often referred to as firing in e.g. glass industry. If desired, the air may comprise increased amounts of water (steam) to further enhance curing and formation of an inorganic oxide coating. The product obtained by such process is typically a fully inorganic porous coating.

In a further preferred embodiment of the coating process of the invention such curing step is combined with a glass tempering step; i.e. heating the coated glass substrate to about 600-700° C. during a few minutes, followed by quenching, to result in AR-coated toughened or safety glass.

The invention further relates to an AR coated transparent substrate that is obtainable by or is obtained with the process according to the invention and as described hereinabove, including all combinations and perturbations of indicated features and embodiments.

An anti-reflective (AR) or light reflection reducing coating is a coating that reduces the reflection of light from the surface of a substrate at one or more wavelengths between 425 and 675 nm, as measured at 5° incident angle. Measurements are carried out on the coated and uncoated substrate. Preferably the reduction in reflection is about 30% or more, preferably about 50% or more, more preferably about 70% or more, even more preferably about 85% or more. The reduction in reflection as expressed in a percentage is equal to 100×(reflection of the uncoated substrate−the reflection of the coated substrate)/(reflection of uncoated substrate).

Typically, the AR coated substrate obtainable by the process according to the invention shows very good AR properties, in combination with good mechanical performance, like abrasion resistance passing the felt test as defined in EN1096-2. The AR coated substrate according to the invention shows at a coated side a minimum reflection of 2% or less at a certain wavelength, preferably about 1% or less, and more preferably of at most about 1.4, 1.2, 1.0, 0.8 or 0.6% (for two-sided coated substrate). The average reflection over a 425-675 nm wavelength range for a two-sided coated substrate is preferably about 3% or less, and more preferably at most about 2.5, 2, 1.8, 1.7, 1.6 or 1.5%.

The AR coated substrate according to the invention may be used in many different applications and end-uses, like window glazing, cover glass for solar modules, including thermal and photo-voltaic solar systems, or cover glass for TV screens and displays. The invention thus further relates to an article comprising the AR coated substrate obtained with the process according to the invention. Examples of such articles include solar panels, like a thermal solar panel or a photo-voltaic module, monitors, touch-screen displays for mobile phones, tablet pc's or all-in-one pc's, and TV sets.

The invention further relates to a method of making organic-inorganic core-shell or inorganic hollow nano-particles. More specifically, the invention concerns a method for making organic-inorganic core-shell particles comprising steps 1) and 2) of the process of making an anti-reflective coating composition as described in the above, including all preferred embodiments. The method may further comprise a step of isolating the nano-particles from the dispersion obtained; using any method as known in the art like filtration, freeze-drying or spray-drying techniques.

The invention also relates to a method of making hollow inorganic nano-particles comprising steps 1) and 2) of the process of making an anti-reflective coating composition as described in the above and a further step of at least partially removing the core or template from the core-shell nano-particles to result in a porous or hollow core (for simplicity together referred to as hollow core). The organic core may comprise compound A, organic solvent, copolymer C, and optionally other surfactant. This core can be at least partly removed by evaporating volatile components; and/or by solvent extraction or etching, thermal degradation, catalytic decomposition, photo-degradation, electron beam or laser irradiation, and combinations thereof; optionally followed by evaporating the degradation products. The method may further comprise a step of isolating the nano-particles from the dispersion obtained; using any method as known in the art like filtration, freeze-drying or spray-drying techniques. Core material may be removed, partially or virtually completely, while the nano-particles are still in dispersed form, but also during or after separating the particles from the dispersion for a subsequent use The invention further relates to organic-inorganic core-shell or inorganic hollow nano-particles as obtained with said methods of the invention, to compositions comprising such nano-particles, and to different uses of said nano-particles and compositions. Products obtained with the methods according to the invention are hybrid organic-inorganic particles or hollow inorganic nano-particles, in dispersed form or as dried nano-particles. Dispersed product is found to show remarkably good storage and handling stability, meaning the dispersion shows little tendency to changing viscosity or gelling compared to other sol-gel process based dispersions. It was further found that the solids content of the dispersion may be adjusted by evaporation or dilution, which greatly increases the possibilities for using the dispersion obtained in a number of different applications.

The nano-particles made with the method according to the invention typically have an particle size of at most 300 nm, more preferably at most 250, 200, 150, or 100 nm. Preferably, the particle size is preferably at least 35, 40, 45 or 50 nm. The size and shape of the individual core-shell nano particles varies considerably for nano particles of a coating composition according to the invention. It is therefore emphasized that particle size herein refer to the Z-averaged hydrodynamic diameter measured by determined by Dynamic Light Scattering (DLS) on dispersions on a Malvern Nano ZS as discussed above.

The invention further relates to compositions comprising the nano-particles as obtained with the methods according to the invention; and to different uses of said nano-particles and compositions, as well as to products comprising or made from said nano-particles and compositions, including paint compositions, cosmetic compositions, controlled-release medicaments, and composite materials.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular or preferred aspect, embodiment or example of the invention are to be understood to be applicable to any other aspect, embodiment or example described herein unless stated otherwise or obviously incompatible therewith.

The invention will be further illustrated by the following examples and comparative experiments, without being limited thereto.

EXPERIMENTS

Organic Compounds

Table 1 provides relevant data on compounds A that are applied in experiments as organic core or template.

TABLE 1

| Reference | Compound | Melting point (° C.) | Boiling point (° C.) | Solubility in water (kg/m$^3$) |
|---|---|---|---|---|
| A1 | Cyclohexane | 6.5 | 81 | 0.04 |
| A2 | Toluene | −93 | 110 | 0.5 |
| A3 | Isoamyl acetate | −78 | 142 | 1.1 |

Cationic Copolymers

Table 2 presents monomer composition for a number of cationic copolymers C, which are obtained following the procedure described in the experimental part of EP2178927, which is incorporated herein by reference. Copolymers were used as aqueous dispersion with a concentration of about 20 mass %, with pH of about 4 (acidified with formic acid). The copolymers had Mw in the range 25-40 kDa (GPC).

TABLE 2

| monomer | C1 | C2 | C3 | C4 | C5 |
|---|---|---|---|---|---|
| | | Comonomer content (mole %) | | | |
| DMAEMA | 10.1 | 38.3 | 17.5 | 10.3 | 8.3 |
| MMA | 89.9 | 61.7 | 82.5 | — | 91.7 |
| IBOA | — | — | — | 89.7 | — |

DLS Measurements

A Malvern Nano ZS dynamic light scattering instrument was used to measure particle size of dispersed particles on 1 drop of dispersion in 10 ml aqueous KCl solution (1 mmol/L) at 25° C. and in back-scattering mode. Particle size herein refers to average particle size measured as Z-averaged hydrodynamic diameter.

Felt Test

Scratch resistance of applied coating layers was evaluated by the felt test according to EN1096-2.

Optical Properties

Reflection and transmission of coated transparent substrates were evaluated with a Shimadzu UV-2450 spectrophotometer. Relative specular reflectance was measured at an incident angle of 5° with a reflectance attachment. For measuring transmission the integrating sphere attachment was installed in the sample compartment, and incidence angle was 0° (normal to the sample surface).

Average reflection values are calculated for the wavelength range 425-675 nm. Measurements are performed on two-sided coated plates.

Example 1

20 grams of cyclohexane (p.a.) containing 1 mass % of heptadecane was dispersed using a Ultra-turrax unit T25 into a mixture of 14 grams Milli-Q water, 1 gram of 2-propanol and 15 grams of a dispersion containing 21.5 mass % of cationic copolymer C1 (Mw about 30 kDa). The resulting coarse emulsion was further dispersed using a high-pressure homogenizer (DeBee, operated at a pressure 30 kPsi, using diamond orifice and applying water cooling) in 9 cycles of about 15 strokes each and allowing the temperature to decrease after each cycle to 40° C. This resulted in a stable emulsion with emulsion droplets of particle size (DLS Z-averaged hydrodynamic diameter) of 265 nm (Polydispersity Index, PDI 0.28). To this emulsion 2 grams of copolymer C1 were added, rendering a clear positive charge of the droplets, indicated by the zeta potential >+11 mV (pH 4). Silication was then performed by gradually adding (90 minutes) by perfusor pump 41.5 g of tetramethoxy silane (TMOS) to a mixture of 35 g of the resulting emulsion and 80 g Milli-Q water, under firmly stirring with magnetic stirring bar. After the addition was completed stirring was continued for another 90 minutes. 100 g of the mixture was diluted with 100 g of Milli-Q water and acidified with 6 drops of concentrated HNO$_3$. The DLS size of the final product was 255 nm (PDI 0.20) and TEM analysis revealed spherical silica particles with particle size in the range 60-120 nm. (see FIG. 1).

Cyclohexane could be removed by rota-evaporation treatment, while gradually increasing the water temperature of the water bath from 30 to 40° C., and reducing the pressure from 300 to 100 mbar. The final dispersion contained 6.4 mass % of hollow silica particles with DLS size of 219 nm (PDI 0.35) and zeta potential of 12 mV (pH=4); and was found to be stable in time.

Example 2

Example 1 was repeated, but now 20.7 g of TMOS was used. After evaporation of cyclohexane TEM analysis showed hollow silica spheres of similar size as in Example 1, but the particles appeared to be partly collapsed; likely due to limited strength of the silica shell during sample preparation for the TEM analysis.

Comparative Experiment 3

Example 1 was repeated, but now copolymer C2 was used. It appeared not possible to obtain a stable emulsion of cyclohexane; polymer C2 apparently being too hydrophilic to function as emulsion stabilizer.

Example 4

Example 1 was repeated, but now copolymer C3 was used. After evaporation of cyclohexane TEM analysis showed hollow silica particles of similar size as in Example 1, but the particles appeared to be less regularly shaped.

Example 5

21 g of cyclohexane containing 1 mass % of heptadecane was dispersed using a Ultra-turrax unit T25 into 51.3 g of a dispersion containing 17.4 mass % of cationic copolymer C4 (Mw about 31 kDa). This resulted in a stable emulsion (>1 week) with emulsion droplets of DLS size of 202 nm (PDI 0.02). Silication was performed by gradually adding (90 min) 41.5 g of TMOS to a mixture of 35 g of the resulting emulsion and 80 g Milli-Q water, while firmly stirring with magnetic stirring bar. After the addition was completed the dispersion was stirred for another 90 minutes. 135 g of the mixture was diluted in 750 g Milli-Q water and acidified with 15 drops of concentrated HNO$_3$. The final dispersion of 2.2 mass % displayed a DLS size of 200 nm (PDI 0.06), a zeta potential of +19 mV at pH 4.0 and was stable for more than one week. A TEM micrograph on the resulting dispersion after sample preparation showed spherical hollow silica particles of about 100-150 nm and a shell thickness of about 10 nm; also showing some collapsed particles.

Cyclohexane was removed from the dispersion by spray-drying (Büchi Mini Spray drying B-191) at an evaporation temperature of 130-150° C., flow rate at 270 mL/h in combination with an air flow of 640 normal L/h. TEM performed on the obtained white powder showed aggregated particles having multi-hollow structure. The product showed opacifier (whitening) power, when applied as a simple paint formulation on black photo paper.

Example 6

Figure 3:
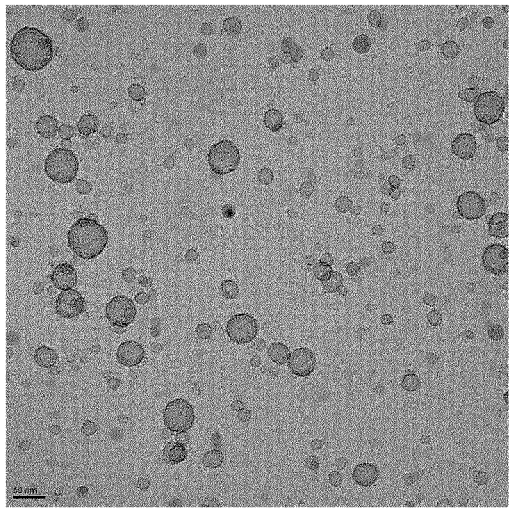
FIG. 3 is a TEM micrograph of the spherical particles showing a core-shell structure obtained by Example 6 below.

23.3 g of toluene was mixed with 52.6 g of a dispersion of copolymer C5 (19 mass % in water, pH 3.9, particle size 44 nm (PDI 0.06) by DLS) using a Dispermat mixing unit, and then diluted with 180 grams of water; resulting in about 13 mass % emulsified droplets in water. To 100 g of this emulsion 52 g of TMOS was added drop-wise over 2 hours at ambient temperature under stirring. Particle size of resulting particles was about 82 nm (according to DLS). The obtained dispersion was acidified with 50% nitric acid to a pH of 1.8; and showed stability over time. A TEM micrograph revealed spherical particles showing a core-shell structure, and particle size in the range 30-80 nm (see FIG. 3).

Example 7

50 g of isoamyl acetate was mixed with 113 g of a dispersion of copolymer C5 (19 mass % in water, pH 3.9, particle size 44 nm (PDI 0.06) by DLS) using a Dispermat mixing unit, and then diluted with 385 grams of water; resulting in about 13 mass % emulsified droplets in water. To 180 g of this emulsion 70 g of TMOS was added drop-wise over 2 hours at ambient temperature under stirring. Particle size of resulting particles was about 100 nm (according to DLS). The obtained dispersion was acidified with 50% nitric acid to a pH of 1.9; and showed stability over time. Moreover, the dispersion could be diluted with water, ethanol, or isopropanol and remain stable (no visual flocculation or sedimentation).

Figure 4:
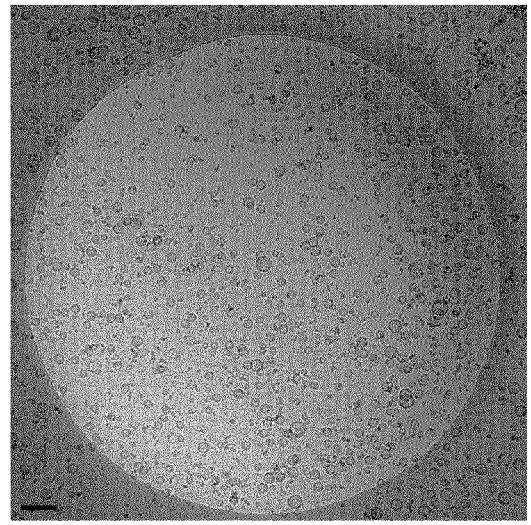
FIG. 4 is a cryo-TEM micrograph of the spherical particles showing a core-shell structure obtained by Example 7 below.

A Cryo-TEM micrograph revealed spherical particles showing a core-shell structure, and particle size in the range 30-70 nm (see FIG. 4).

Several AR coatings were prepared from the dispersion obtained, by diluting with isopropanol and adding different amounts of a sol made from tetraethoxy silane (TEOS) as binder.

The sol of TEOS was prepared by adding to a solution of TEOS in iso-propanol a molar excess of water while stirring, to pre-hydrolyse the silane compound. After cooling back to room temperature glacial acetic acid was added, and after 24 hrs stirring at ambient conditions more iso-propanal and nitric acid (65%) were added. The resulting dispersion contained about 4 mass % of silica particles of about 3-5 nm size.

Composition 7-1 was made by diluting the core-shell particles dispersion with 5-fold amount of acidified isopropanol, followed by adjusting pH of the final dispersion to 1.5 by adding nitric acid (50%).

Compositions 7-2, 7-3, 7-4 and 7-5 were prepared by mixing an amount of above prepared core-shell particles dispersion with different amounts of the TEOS sol as binder and iso-propanol, after which the pH was adjusted to about 1.5 by adding nitric acid (50%). The amount of binder was calculated as mass of $SiO_2$ resulting from TEOS relative to the sum of binder and core-shell particles.

The obtained coating compositions were used to provide coating layers to glass plates by dip-coating in a dust-free room. Pilkington Optiwhite S glass plates of 2 mm thickness were cleaned with water and household cleaner, then rinsed with water and demi-water, and then dip-coated by immersing in a container with coating composition; the coating bath being kept at room temperature (at about 21° C.) and 50% relative humidity. The plate was then vertically pulled up from the bath at a rate of about 2.5 mm/s. The coated plate was subsequently dried at ambient conditions for at least 5 minutes.

Figure 2:
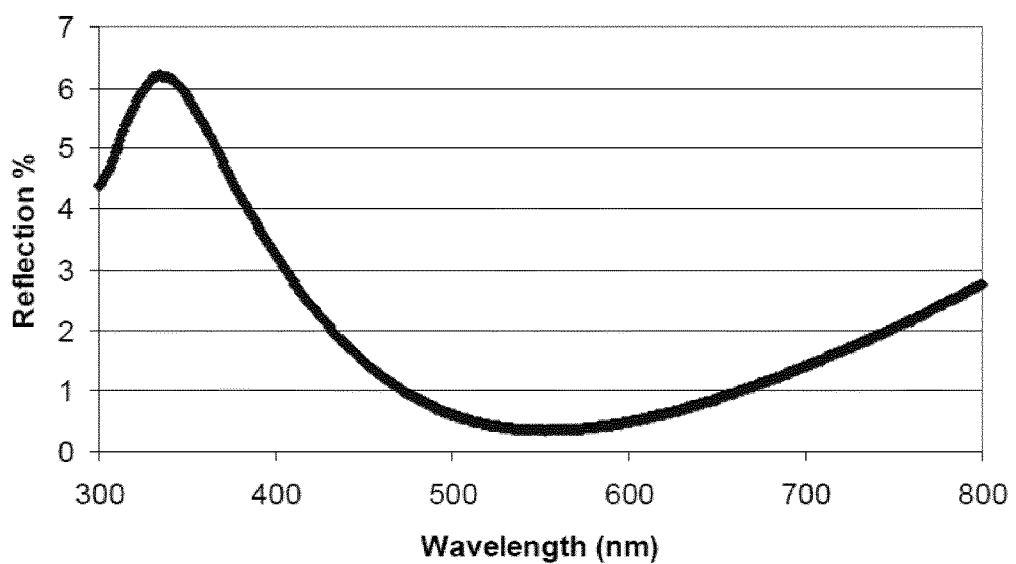
FIG. 2 is a reflection curve measured for sample 7-1 of Example 7 below.

After drying the coated glass was cured at 125° C. during 15 minutes in an air circulation oven, or cured at 650° C. during 2.5 minutes. All samples passed the felt test. Minimum reflection of the samples cured at 650° C. was between 0.5 and 1%. As an example the reflection curve measured for sample 7-1 is shown in FIG. 2. In case the coated plates were cured at 125° C. the average reflection was between 1.7 and 3.2%. This difference in reflection can be attributed to different porosity levels, resulting from the copolymer present in the core-shell particles being pyrolysed and evaporated at 650° C.; but not at the low curing temperature, whereas curing at 125° C. will result in evaporation of the organic compound contained in the core-shell particles dispersion, and thus in some porosity. Reflection data are summarized in Table 3.

Comparative Experiment 8

Figure 5:
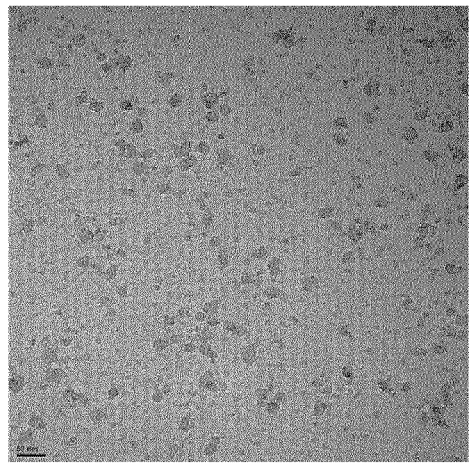
FIG. 5 is a cryo-TEM micrograph of the spherical particles showing a core-shell structure obtained by Comparative experiment 8 below.

52.6 g of dispersion of copolymer C5 (19 mass % in water, pH 3.9, particle size 44 nm (PDI 0.06) by DLS) was mixed with 173.3 g of water (~5% emulsion stabilizer in water), and subsequently 20 g of TMOS was drop-wise added over 2 hours at ambient temperature. Increase of particle size to about 84 nm (according to DLS) was observed. The obtained dispersion was acidified with 50% nitric acid to a pH of 1.8; and showed stability over time. A cryo-TEM micrograph shows spherical, but somewhat aggregated particles having core-shell structure, with particle size in the range 25-90 nm (see FIG. 5).

Analogously to Example 7, AR coating compositions were made by combining the obtained dispersion with different amounts of TEOS sol and iso-propanol; and used for preparing coated glass samples. For the products obtained average reflection is about 1% when cured at 650° C., but is above about 5.8% when cured at 125° C. This difference indicates that at low temperature hardly any porosity is obtained, whereas at high temperature porosity may result from calcination of organic copolymer in the coating; demonstrating the advantage of the coating composition according to the invention as prepared in e.g. Example 7 particularly when prepared at cured at low temperature where the emulsion stabilizer is not pyrolysed or evaporated. Results are summarized in Table 3.

TABLE 3

| Sample | Amount of binder (mass %) | Average reflection (%) (cured at 125° C.) | Average reflection (%) (cured at 650° C.) |
| --- | --- | --- | --- |
| Example 7-1 | 0 | 1.7 | 0.8 |
| Example 7-2 | 9 | 2.3 | 0.8 |
| Example 7-3 | 16 | 2.4 | 0.8 |
| Example 7-4 | 23 | 2.7 | 1.1 |
| Example 7-5 | 28 | 3.2 | 1.8 |
| Comp. exp. 8-1 | 0 | 5.8 | 0.8 |
| Comp. exp. 8-2 | 21 | 7.1 | 0.9 |
| Comp. exp. 8-3 | 36 | 5.9 | 0.8 |
| Comp. exp. 8-4 | 45 | 6.0 | 1.2 |
| Comp. exp. 8-5 | 52 | 6.1 | 1.1 |

Humidity sensitivity: For the comparative AR coating compositions, where only the emulsion stabilizer and no component A is present, the minimum reflection is below 1% when cured at 650° C., but increases to above 3% at 90% relative humidity. It could be theorized (without being limited thereto) that this may be due the mesoporosity of the coating. When AR coating compositions according to the invention wherein component A is present in the nano particles are cured at 650° C. the minimum reflections stay below 1.5% even at 90% relative humidity. It could be theorized (without being limited thereto) that this may be may be due to the reduced amount of mesopores in ARCs based on AR coating compositions comprising core-shell nano particles with component A in the core.

Outdoor durability: After accelerated outdoor durability tests (1000 hours @ 85% relative humidity and 85° C.) the AR coatings are off white possibly due to sodium and calcium salts having diffused out of the glass plates, but after washing with water and ethanol the AR properties are retained for ARCs based on the AR coating compositions according to the invention (less than 0.5% drop in maximum transmission).

Mechanical properties: The scratch resistance of the ARCs based on the AR coating compositions 13.1-13.4 as well as on the comparative AR coating composition pass the felt test according to EN 1096-2 with a change in transmission of less than 0.5%.

Example 9

Several AR coating formulations were prepared by mixing core-shell particle dispersions of Example 6 (with toluene as component A) with isopropanol and varying amounts of binder in the form of the sol of TEOS prepared as described in Example 7.

AR Coating formulation 9.1: (No binder): To 500 grams of isopropanol 6.5 grams of 1:1 65% nitiric acid/water was added after which 90 grams of the core-shell particle dispersion of Example 6. Final pH of the formulation is 1.6 and particle size of 87 nm according to DLS. After 6 weeks at room temperature the DLS value was increase less than 10 nm indication good storage stability of the particles. The formulation contains an equivalent $SiO_2$ content of 1.27%.

Comparative AR coating formulation 9.2: (100% binder): Binder in the form of the sol of TEOS prepared as described in Example 7 containing an equivalent amount of silica of 4% was diluted with isopropanol to a relative amount of 1.27% $SiO_2$.

AR coating formulation 9.3: (35% binder): To 200 grams of the core-shell particle dispersion of Example 6, 107.8 grams of binder in the form of the sol of TEOS prepared as described in Example 7 was added so a $SiO_2$ equivalence ratio of 35/65 was obtained.

AR coating formulation 9.4: (65% binder): To 100 grams of the core-shell particle dispersion of Example 6, 185.9 grams of binder in the form of the sol of TEOS prepared as described in Example 7 was added so a $SiO_2$ equivalence ratio of 65/35 was obtained.

AR coating formulation 9.5: (90% binder): To 100 grams of the core-shell particle dispersion of Example 6, 900.7 grams of binder in the form of the sol of TEOS prepared as described in Example 7 was added so a $SiO_2$ equivalence ratio of 90/10 was obtained.

The pH of the formulations was maintained at 1.5+/−0.2 and adjusted with nitric acid if needed.

Coating formulations 9.1-9.5 were dip coated and assessed on the optical properties via optical transmission measurements relative to glass (type Pilkington Optiwhite S; average transmission between 350 and 850 nm of 91.4%). Morphology of the coatings (only dried at room temperature) was determined via cross-section SEM analysis. To achieve complete drying and hardness, the transmission was measured after 1 week.

TABLE 4

Figure 6:
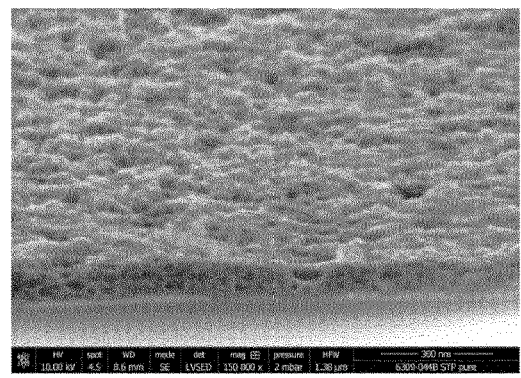
FIGS. 6-10 are SEM micrographs of cross-sections of the particles described in Example 9 and Table 4 below.
Figure 7:
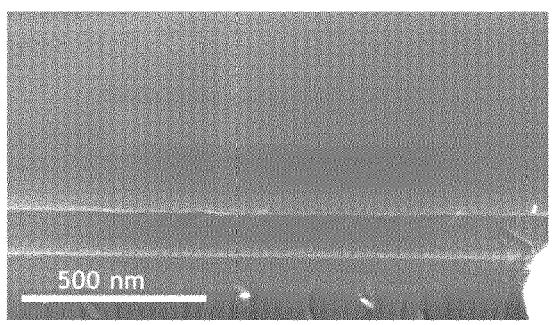
Figure 8:
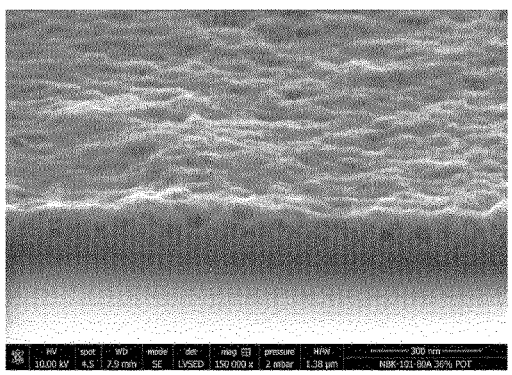
Figure 9:
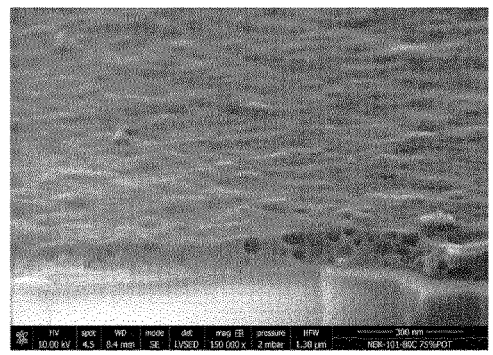
Figure 10:
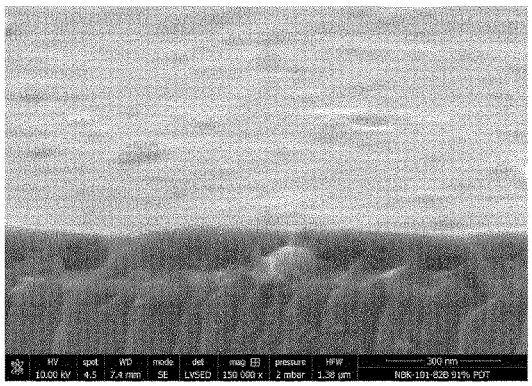

| Sample | Cross section | Average transmission gain | Observations |
|---|---|---|---|
| AR coating formulation 9.1 | FIG. 6 | 6.02% | Many core-shell particles with rather rough coating surface |
| Comparative AR coating formulation | FIG. 7 | 2.27% | No pores observed. Nano pores between binder particles may be present but are too small to be observed with this technique. Very smooth surface |
| AR coating formulation 9.3 | FIG. 8 | 5.5% | Core-shell particles observed and some surface roughness |
| AR coating formulation 9.4 | FIG. 9 | 5.05% | Core-shell particles observed and some surface roughness |
| AR coating formulation 9.5 | FIG. 10 | 4.05% | Only limited number of core-shell particles observed. Smooth surface |

Figure 11:
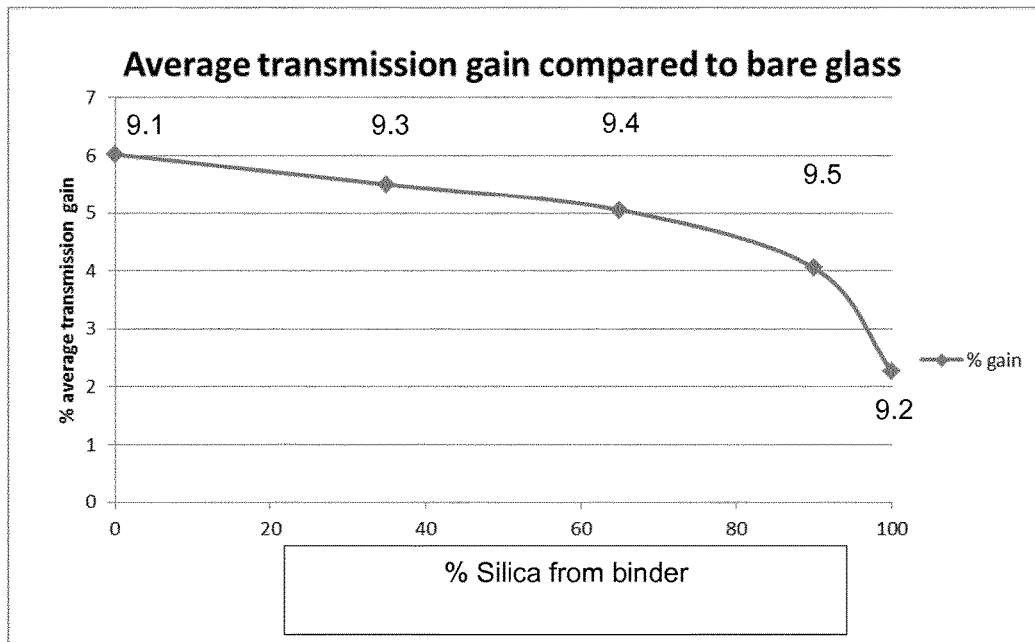
FIG. 11 is a graph of the average transmission gain plotted as a function of the origin of the silica as described in Example 9 below.

In FIG. 11, the average transmission gain is plotted as a function of the origin of the silica. Each sample composition is indicated with number. Surprisingly, a highly un-linear behavior is observed in that the transmission gain remains high even at very binder contents and that the transmission gain only is reduced substantially when more than 90% of the silica originates from the binder.

Mechanical performance was evaluated using abrasion test performed according to NEN-EN 1096-2). For all formulation above >50% POT only minor changes (<0.5%) in transmission gain were observed after the test. Hence, even after the abrasion test, good optical properties are obtained that are of interest for commercial application in for example the solar cell cover glass market.

The invention claimed is:

1. An anti-reflective coating composition comprising organic-inorganic core-shell nano-particles having a particle size of 35-300 nm, wherein
   the particle size is a Z-averaged hydrodynamic diameter measured by DLS, the organic-inorganic core-shell nano-particles having a mass ratio of core/shell of from 0.2 to 25, wherein
   the core is a sum of an organic compound A and an emulsion stabilizer C at a mass ratio C/A of 0.1 to 2, and wherein
   the shell is formed of a metal oxide equivalent consisting of a mass of metal oxide resulting from complete conversion of at least one inorganic metal oxide precursor selected from the group consisting of metal salts, metal chelates and organo-metallic compounds, and wherein
   the compound A is an apolar non-polymeric organic compound having a solubility in water of at most 5 $kg/m^3$, and wherein
   the emulsion stabilizer C is a cationic addition copolymer having an overall positive zeta potential which is comprised of at least one monomer unit having a cationic charge and at least one monomer unit being neutral or non-ionic.

2. The anti-reflective coating composition according to claim 1, wherein the compound A has a boiling point of at least 10° C. and at most 300° C.

3. The anti-reflective coating composition according to claim 1, where the compound A has a solubility in water at room temperature of at most 3 kg/m$^3$.

4. The anti-reflective coating composition according to claim 1, wherein the compound C is a copolymer of:
   (i) at least cationic or basic monomer (M1),
   (ii) at least one neutral or non-ionic monomer (M2); and
   (iii) at least one polar, anionic or acidic monomer (M3).

5. The anti-reflective coating composition according to claim 4, wherein copolymer C is a copolymer of:
   (i) 1-25 mole % of the at least one cationic or basic monomer M1;
   (ii) 50-99 mole % of the at least one non-ionic apolar monomer M2; and
   (iii) 0-25 mole % of the at least one polar, anionic or acidic monomer M3; wherein
   the monomers M1, M2, and M3 sum to 100 mole %.

6. The anti-reflective coating composition according to claim 5, wherein the at least one cationic or basic monomer M1 comprise vinyl monomers with a tertiary amine group.

7. The anti-reflective coating composition according to claim 5, wherein copolymer C is a copolymer of:
   (i) 5-15 mole % of the at least one monomer M1;
   (ii) 75-95 mole % of the at least one monomer M2; and
   (iii) 0-10 mole % of the at least one monomer M3.

8. The anti-reflective coating composition according to claim 5, wherein copolymer C is obtained from:
   5-15 mole % of the at least one monomer M1 which is selected from the group consisting of amino-functional (meth)acrylates and (meth)acrylamides; and
   85-95 mole % of the at least one monomer M2 which is selected from the group of C1-C18 alkyl (meth)acrylates.

9. The anti-reflective coating composition according to claim 1, wherein a mass ratio C/A of the copolymer C to the compound A is 0.15-1.0.

10. The anti-reflective coating composition according to claim 1, wherein the composition further comprises a binder.

11. The anti-reflective coating composition according to claim 10, wherein the binder comprises an inorganic oxide precursor.

12. The anti-reflective coating composition according to claim 1, wherein the at least one inorganic metal oxide precursor comprises at least one metal selected from the group consisting of Si, Al, Be, Bi, B, Fe, Mg, Na, K, In, Ge, Hf, La, lanthanoids, Sb, Sn, Ti, Ta, Nb, Y, Zn and Zr.

13. The anti-reflective coating composition according to claim 1, wherein the at least one inorganic metal oxide precursor comprises a metal alkoxide.

14. The anti-reflective coating composition according to claim 1, wherein the at least one inorganic metal oxide precursor comprises an alkoxy silane.

15. An anti-reflective coated transparent substrate comprising a substrate and a coating on a surface of the substrate, wherein the coating comprises the anti-reflective coating composition according to claim 1.

16. A substrate comprising a surface, wherein the surface comprises the anti-reflective coating composition according to claim 1.

* * * * *